H. CHRISTOPHERSEN.
ROLLER BEARING.
APPLICATION FILED AUG. 7, 1911.

1,045,814.

Patented Dec. 3, 1912.
2 SHEETS—SHEET 1.

Witnesses:

Inventor:
Herbert Christophersen
By his Attorneys,

H. CHRISTOPHERSEN.
ROLLER BEARING.
APPLICATION FILED AUG. 7, 1911.
1,045,814.
Patented Dec. 3, 1912.
2 SHEETS—SHEET 2.
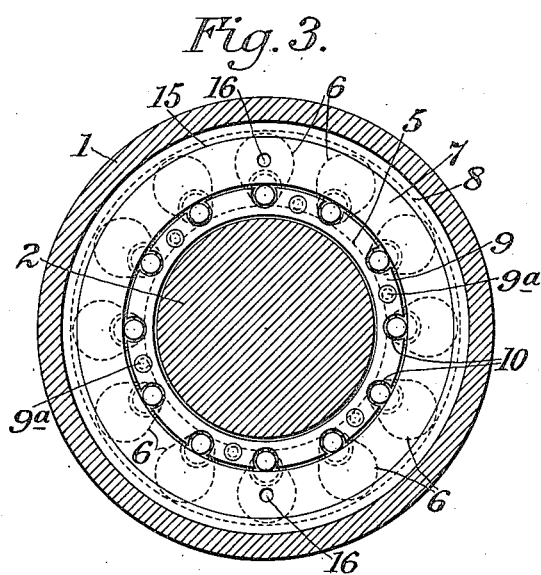
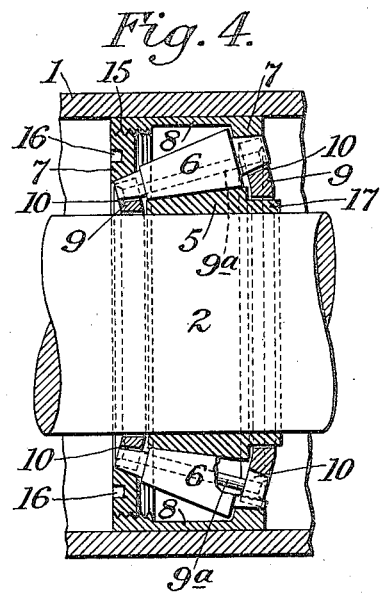
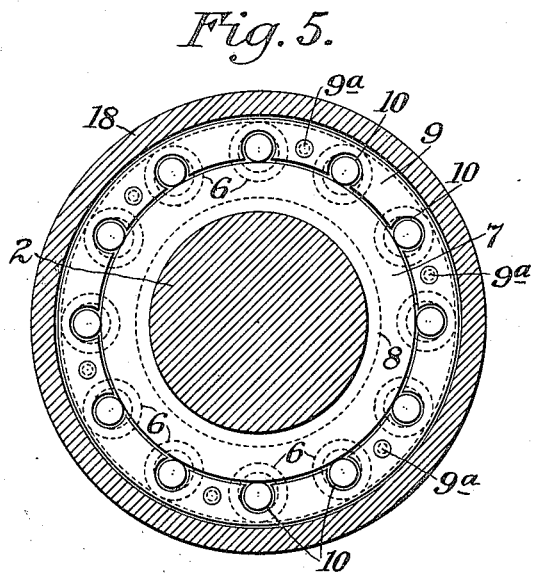
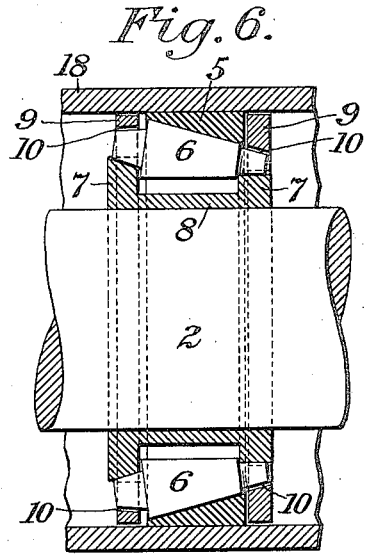
Witnesses:
Inventor:
Herbert Christophersen
By his Attorneys,

UNITED STATES PATENT OFFICE.

HERBERT CHRISTOPHERSEN, OF EAST ORANGE, NEW JERSEY, ASSIGNOR TO NEW YORK OILLESS BEARING COMPANY, OF NEW YORK, N. Y., A CORPORATION OF NEW YORK.

ROLLER-BEARING.

1,045,814.  Specification of Letters Patent.  Patented Dec. 3, 1912.

Application filed August 7, 1911. Serial No. 642,804.

*To all whom it may concern:*

Be it known that I, HERBERT CHRISTOPHERSEN, a citizen of the United States, residing at East Orange, in the county of Essex and State of New Jersey, have invented certain new and useful Improvements in Roller-Bearings, of which the following is a specification, reference being had to the accompanying drawings, forming a part hereof.

Heretofore roller bearings comprising cylindrical rollers and having cylindrical trunnions secured thereto, have been employed, in which the load was transmitted from the wheel or housing through the trunnions and the roller to the axle. Such construction, however, required separate means for taking up the end thrust, and such difficulty has been experienced in properly providing for the end thrust in bearings of this character.

The primary object is to provide a roller bearing in which the load is transmitted from the rollers through trunnions secured thereto, which will absorb or take up end thrust.

A further object of the invention is to provide a roller bearing of the class described which will be compact in construction and which will permit the necessary adjustments to be made.

The various other objects of the invention will be more fully set forth in the following description of mechanism embodying the invention, which consists in the new and novel features of construction and combinations of parts hereinafter set forth and claimed.

Figure 1:
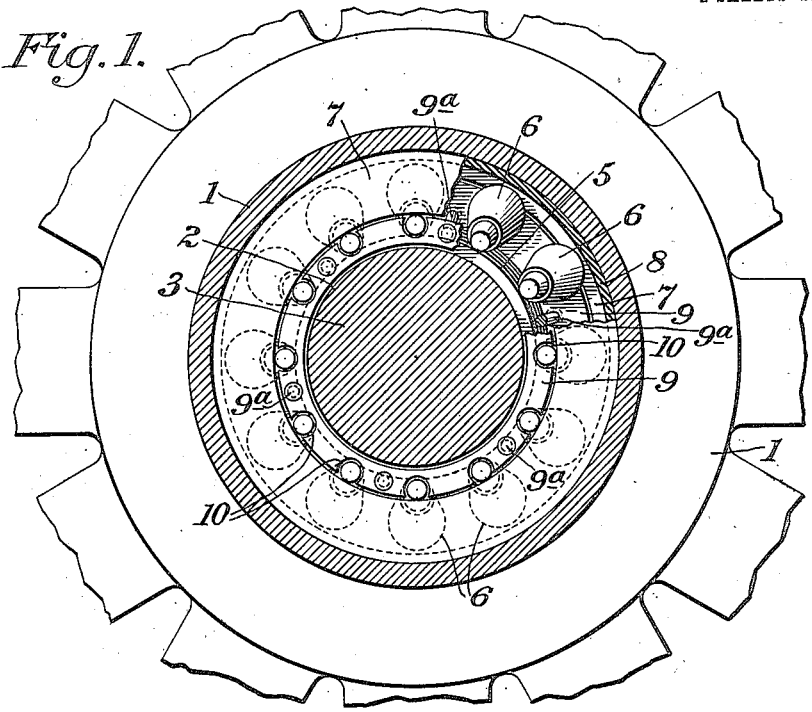
Figure 2:
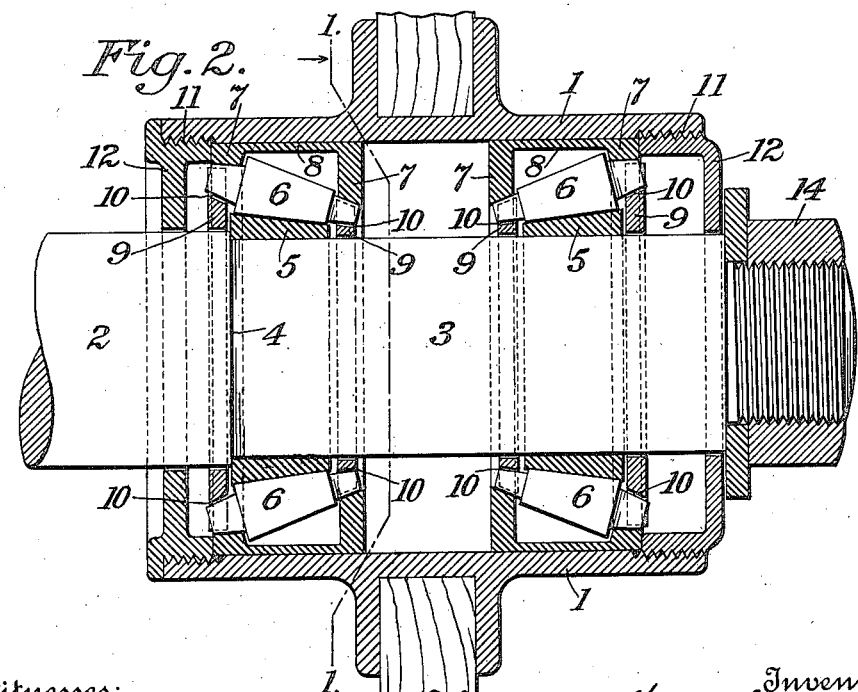

In the accompanying drawings:—Figure 1 is an end view of a wheel provided with my improved bearing, the said wheel and shaft being shown in section and the bearing being partly broken away to more clearly disclose the construction thereof. Fig. 2 represents a side elevation in section of the bearing shown in Fig. 1. Fig. 3 represents an end view of a bearing applied to a rotatable box or housing and embodying various modifications of the construction shown in Fig. 1. Fig. 4 is a vertical section of the bearing shown in Fig. 3. Fig. 5 is an end view of the bearing corresponding with Fig. 3, showing the box or casing supported from the roller. Fig. 6 is a vertical section of the bearing shown in Fig. 5.

Referring particularly to the construction shown in Figs. 1 and 2 my improved bearing is illustrated as applied to a wheel 1 rotatable upon a relatively stationary axle 2. Said axle is turned down to form the spindle 3, leaving a shoulder 4 in the usual manner. A plurality of tapered roller race members 5 are secured to the spindle and suitably spaced apart. Said races are provided with conical bearing surfaces and are oppositely tapered with respect to each other.

A plurality of bearing ledges 7 are secured to the hub, which are arranged in planes outside of, but approximate to the respective ends of the roller races. Said ledges may be formed integral with each other by a connecting web 8. Said ledges are of different depths and are tapered to correspond with the surfaces of the trunnions bearing thereon.

A plurality of rollers 6 are mounted on each roller race, each roller being tapered so as to rotate thereon. Each roller is provided at each end thereof with a tapered trunnion having the same axis as the roller, but are of different radius, the trunnion secured to the larger end of the roller having a larger diameter at its base than the trunnion secured to the smaller end of the roller. In order to hold the rollers in proper spaced relation with each other, separators 9 are provided, having restricted openings 10 which permit segments of the rollers adjacent to the bearing ledges to project beyond the periphery of the retainer. Said retainers fit loosely with respect to the axle, and may be secured together by rods 9$^a$.

Preferably both ends of the hub are threaded as at 11 permitting caps 12 to be secured thereto. Said caps not only serve as dust caps, but also provide means for adjusting the bearings with relation to each other and particularly for adjusting the bearing ledges with relation to the adjacent roller race. Said caps also prevent displacement of the bearing ledges. Check nut 14 holds the wheel against displacement.

In operation the bearing is assembled and then placed in position with relation to the hub and the spindle by a drive fit. The load is transmitted upon the roller race to the rollers and thence to the trunnions, the bearing ledges and the hub.

In the construction shown in Figs. 3 and 4 bearing ledges are formed separately and are secured together and adjusted with relation to each other in any suitable manner as by screw threads 15. As shown in this construction the retainer may be bent so that the fact of the peripheral opening will be parallel to the surface of the trunnion, thus eliminating the possibility of friction even when the parts of the bearing are badly worn and permitting the retaining rings to be brought close to the bases of the rollers and the retainer rods $9^a$ to be arranged perpendicularly to the retainer. The detachable member of the bearing ledge may be provided with a socket 16 so that it can be adjusted with respect to the opposite bearing ledge and also with respect to the trunnions. The roller race is provided with an annular flange or extension 17 which preferably projects outside of the plane of the opposing bearing ledge and also outside of the plane of the retainer and thus provides means for adjusting the roller race with relation to the bearing faces of the rollers.

It will be obvious that the roller race may be secured to a hub, housing or pulley instead of being secured to the axle. This modification is shown in Figs. 5 and 6, where the roller race 5 is secured to the housing or pulley 18. The opposing bearing ledges are mounted directly upon the axle 2 and the retainers are located between the trunnions and the housing or pulley instead of adjacent to the axle. In this construction the operation of the parts of the bearing is similar to the construction shown in Fig. 2, except that the load is transmitted from the rollers through the trunnions to the bearing ledges and thence to the shaft. By means of this construction I am enabled to provide a simple and compact roller bearing in which the end thrust is taken by the bearing itself and without requiring separate provision for taking care of the end thrust. The bearing may be readily assembled and may be easily adjusted without taking the bearing apart.

Although I have shown various modifications it is obvious that other changes within the skill of the mechanic, may be made in the construction specifically set forth and described without departing from the spirit of the invention provided the means set forth in the following claims be employed.

I claim as my invention:

1. In a roller bearing the combination with a wheel or housing and an axle, of an annular member having a roller race secured to one of said parts having its entire bearing face tapered to form a single conical surface and parallel bearing ledges secured to the other part, the bearing faces of said member and ledges being correspondingly tapered but of different pitch, rollers mounted on said race member and rotatable thereon, trunnions secured to said rollers and projecting from the opposite ends thereof, and tapered to bear on said ledges, retainers for holding said rollers in adjusted position with relation to each other, and means extending outside the plane of said retainers whereby the ledges may be adjusted with relation to each other.

2. In a roller bearing, the combination with a wheel or housing and an axle, of an annular member constituting a roller race secured to one of said parts and parallel bearing ledges secured to the other part, the bearing faces of said member and ledges being correspondingly tapered but of different pitch, rollers rotatably mounted on said race member, tapered trunnions secured to said rollers to bear on said ledges and projecting from the opposite ends thereof, said trunnions having a common axis angularly disposed to the axle, and retainers for holding said rollers in adjusted position with relation to each other.

This specification signed and witnessed this 31st day of July, A. D., 1911.

HERBERT CHRISTOPHERSEN.

Signed in the presence of—
HELEN M. DAMES,
AMBROSE L. O'SHEA.